(12) United States Patent
Savolainen (10) Patent No.: US 12,259,089 B2
(45) Date of Patent: Mar. 25, 2025

(54) CONTROL ARRANGEMENT AND METHOD FOR CONTROLLING A FORESTRY MACHINE

(71) Applicant: PONSSE OYJ, Vieremä (FI)

(72) Inventor: Markku Savolainen, Vieremä (FI)

(73) Assignee: PONSSE OYJ, Vieremä (FI)

( * ) Notice: Subject to any disclaimer, the term of this patent is extended or adjusted under 35 U.S.C. 154(b) by 955 days.

(21) Appl. No.: 17/271,955

(22) PCT Filed: Aug. 28, 2019

(86) PCT No.: PCT/FI2019/050609
§ 371 (c)(1),
(2) Date: Feb. 26, 2021

(87) PCT Pub. No.: WO2020/043946
PCT Pub. Date: Mar. 5, 2020

(65) Prior Publication Data
US 2021/0324998 A1  Oct. 21, 2021

(30) Foreign Application Priority Data

Aug. 29, 2018  (FI) ...................................... 20185712

(51) Int. Cl.
*F16P 3/14*       (2006.01)
*A01G 23/00*   (2006.01)
(Continued)

(52) U.S. Cl.
CPC ............ *F16P 3/142* (2013.01); *A01G 23/083* (2013.01); *F16P 3/141* (2013.01); *F16P 3/147* (2013.01)

(58) Field of Classification Search
CPC . F16P 3/142; F16P 3/141; F16P 3/147; A01G 23/083; A01G 23/00; A01G 23/003; A01G 23/062; A61G 23/083
(Continued)

(56) References Cited

U.S. PATENT DOCUMENTS 3,898,652 A * 8/1975 Rashid .................. G01S 13/931
180/169
5,977,869 A * 11/1999 Andreas ............. B60K 31/0008
701/77
(Continued)

FOREIGN PATENT DOCUMENTS

EP  2 719 275   4/2014
EP  2719274      4/2014
(Continued)

OTHER PUBLICATIONS

Ji-Chil Kim et al., Safety Control of Automatic Excavator for Swing Collision Avoidance, Jun. 30, 2018, Published in 15th International Conference & IEEE, pp. 758-762.*
(Continued)

*Primary Examiner* — Manglesh M Patel
(74) *Attorney, Agent, or Firm* — Nixon & Vanderhye PC (57) ABSTRACT

A control arrangement includes at least one sensor. The sensor is adapted to detect at least one object in an area of at least one predefined sector focused in an area between a control cabin and a boom end, and to detect at least one of: location information of the detected object at two different time instants, at least, and the speed of the detected object. The control arrangement additionally includes at least one control unit adapted to determine at least the direction of travel of the detected object in relation to the control cabin at two different time instants, at least, based on the detected location information and/or the detected speed of the object, and cause a change in the control of a forest machine (Continued)

responsive to the detected direction of movement of the detected object being directed towards the control cabin in the area of the sector.

22 Claims, 4 Drawing Sheets

(51) Int. Cl.
*A01G 23/06* (2006.01)
*A01G 23/083* (2006.01)

(58) Field of Classification Search
USPC .................................................. 701/50, 301
See application file for complete search history.

(56) References Cited

U.S. PATENT DOCUMENTS

| | | | | |
|---|---|---|---|---|
| 6,182,725 B1* | 2/2001 | Sorvik | ................... | A01G 23/08 144/357 |
| 6,223,110 B1* | 4/2001 | Rowe | ................... | E02F 9/2045 37/234 |
| 6,363,632 B1* | 4/2002 | Stentz | ....................... | E02F 9/24 701/50 |
| 6,429,789 B1* | 8/2002 | Kiridena | .............. | G08G 1/0962 340/936 |
| 6,438,491 B1* | 8/2002 | Farmer | ..................... | G01S 7/41 340/436 |
| 6,833,807 B2* | 12/2004 | Flacke | ................... | G01S 13/72 342/195 |
| 7,409,295 B2* | 8/2008 | Paradie | ................. | G06V 20/58 701/45 |
| 7,543,677 B2* | 6/2009 | Igawa | ................. | B60R 21/0134 280/735 |
| 8,010,261 B2* | 8/2011 | Brubaker | .......... | A01D 41/1278 701/1 |
| 8,744,693 B2* | 6/2014 | Hukkeri | .................. | G01S 17/89 701/448 |
| 8,755,976 B2* | 6/2014 | Peters | ................... | G05D 1/0293 701/1 |
| 10,872,514 B1* | 12/2020 | Glatfelter | ............... | G08B 21/18 |
| 2004/0093141 A1* | 5/2004 | Rao | ....................... | B60R 21/013 701/45 |
| 2004/0196146 A1* | 10/2004 | Harter, Jr. | ................. | G01J 5/52 340/435 |
| 2004/0254728 A1* | 12/2004 | Poropat | ................. | G01S 17/933 340/903 |
| 2005/0133115 A1 | 6/2005 | Gatz | | |
| 2006/0249986 A1* | 11/2006 | Yoon | ..................... | B60R 21/131 296/190.03 |
| 2007/0107966 A1* | 5/2007 | Brunner | .................. | G01S 17/42 180/167 |
| 2009/0118913 A1* | 5/2009 | O'Halloran | ............ | E02F 9/028 701/50 |
| 2009/0192683 A1* | 7/2009 | Kondou | ................ | B60W 10/18 701/53 |
| 2010/0228419 A1* | 9/2010 | Lee | .................... | B62D 15/0255 701/25 |
| 2011/0015818 A1* | 1/2011 | Breuer | ................... | G08G 1/167 701/31.4 |
| 2012/0130629 A1* | 5/2012 | Kim | .................... | B60W 30/085 701/301 |
| 2012/0323453 A1* | 12/2012 | Havimaki | .............. | G07C 5/085 701/50 |
| 2013/0103271 A1* | 4/2013 | Best | ........................ | B66C 13/40 701/50 |
| 2014/0081538 A1* | 3/2014 | Maynard | ............... | B66C 15/045 701/50 |
| 2014/0133944 A1* | 5/2014 | Pangrazio | ............. | B66F 17/003 414/667 |
| 2015/0308070 A1* | 10/2015 | Deines | .................... | E02F 3/434 701/50 |
| 2016/0076225 A1* | 3/2016 | Atkinson | .............. | G01S 13/931 701/50 |
| 2016/0138905 A1 | 5/2016 | Einola et al. | | |
| 2017/0000045 A1* | 1/2017 | Linder | ................. | A01G 23/081 |
| 2017/0320212 A1* | 11/2017 | Frisk | ....................... | B25J 19/06 |
| 2018/0179734 A1 | 6/2018 | Yamashita | | |
| 2019/0057606 A1* | 2/2019 | Skvarce | ................. | G08G 1/166 |
| 2020/0146226 A1* | 5/2020 | Hamilton | ........... | G06Q 10/0631 |
| 2020/0189507 A1* | 6/2020 | Green | ...................... | F16P 3/00 |
| 2021/0267132 A1* | 9/2021 | Gibson | .................. | A01G 23/08 |
| 2021/0345560 A1* | 11/2021 | Halonen | ................. | B66C 23/54 |
| 2022/0124990 A1* | 4/2022 | Giudiceandrea | ....... | G01N 23/04 |
| 2023/0116896 A1* | 4/2023 | Hamilton | ................. | B25J 9/162 701/50 |
| 2023/0137344 A1* | 5/2023 | Saito | .................... | G05D 1/0234 701/50 |
| 2023/0138084 A1* | 5/2023 | Kourous-Harrigan | ....................... | G06V 20/58 701/41 |
| 2023/0150358 A1* | 5/2023 | Maley | ................ | B60K 31/0008 701/50 |
| 2023/0265640 A1* | 8/2023 | Wright | .................. | E02F 9/2054 701/50 |
| 2024/0010475 A1* | 1/2024 | Kananoja | ................ | B66C 13/46 |

FOREIGN PATENT DOCUMENTS

| | | |
|---|---|---|
| EP | 3112900 | 1/2017 |
| FI | 121726 | 3/2011 |
| JP | 2001-064992 | 3/2001 |
| JP | 2006-144349 | 6/2006 |
| JP | 2009-121175 | 6/2009 |
| JP | 2012-019702 | 2/2012 |
| WO | 2010/146230 | 12/2010 |

OTHER PUBLICATIONS

Eric Daniel Marks et al., Construction Management and Economics, Apr. 28, 2013, tandfonline.com, pp. 1-13 (pdf).*
Pedro La Hera et al., What Do We Observe When We Equip a Forestry Crane with Motion Sensors, Aug. 2019, Croatian Journal of forest Engineering, pp. 259-280 (pdf).*
Tiago Pereira et al., Sensor Integration in a Forestry Machine, Dec. 15, 2023, mdpi.com, pp. 1-22.*
Extended European Search Report issued on Apr. 29, 2022 in corresponding European Application No. 19854147.6, 8 pages.
International Search Report for PCT/FI2019/050609, mailed Oct. 31, 2019, 5 pages.
Written Opinion of the ISA for PCT.FI2019/050609, mailed Oct. 31, 2019, 7 pages.
Search Report for FI20185712, dated Jan. 25, 2019, 2 pages.
International Preliminary Report on Patentability for PCT/FI2019/050609, completed Nov. 4, 2020, 6 pages.

* cited by examiner

CONTROL ARRANGEMENT AND METHOD FOR CONTROLLING A FORESTRY MACHINE

This application is the U.S. national phase of International Application No. PCT/FI2019/050609 filed 28 Aug. 2019, which designated the U.S. and claims priority to FI patent application Ser. No. 20/185,712 filed 29 Aug. 2018, the entire contents of each of which are hereby incorporated by reference.

BACKGROUND

The invention relates to forestry machines and controlling forestry machines, and in particular to detecting objects in a working environment of forestry machines.

Forestry machines are often used in uneven terrain in the middle of trees and other obstacles, and long and heavy tree trunks are handled. An operator of a forestry machine works in the cabin of the forestry machine. Although the cabins of forestry machines are built strong and safe, tree trunks handled by a forest work unit or other items in the environment of the forestry machine potentially pushing their way into the cabin creates a risk for the work safety of the operator.

BRIEF DESCRIPTION OF THE INVENTION

It is an object of the invention to develop a new control arrangement, method, forestry machine, and computer program product. This object is reached by a control method, forestry machine, method, and computer program product which are characterised by what is stated in the independent claims. Preferred embodiments of the invention are disclosed in the dependent claims.

The solution is based on detecting an object by means of a sensor and control unit, which moves towards the cabin within a predetermined area, such as in the vicinity of the cabin.

The benefit of such a method and arrangement is that a risk for the work safety of an operator may be automatically detected independently of the operator's observations and without active measures by the operator.

BRIEF DESCRIPTION OF THE DRAWINGS

The invention will now be described in more detail in connection with preferred embodiments and with reference to the accompanying drawings, in which.

DETAILED DESCRIPTION OF THE INVENTION

Figure 1:
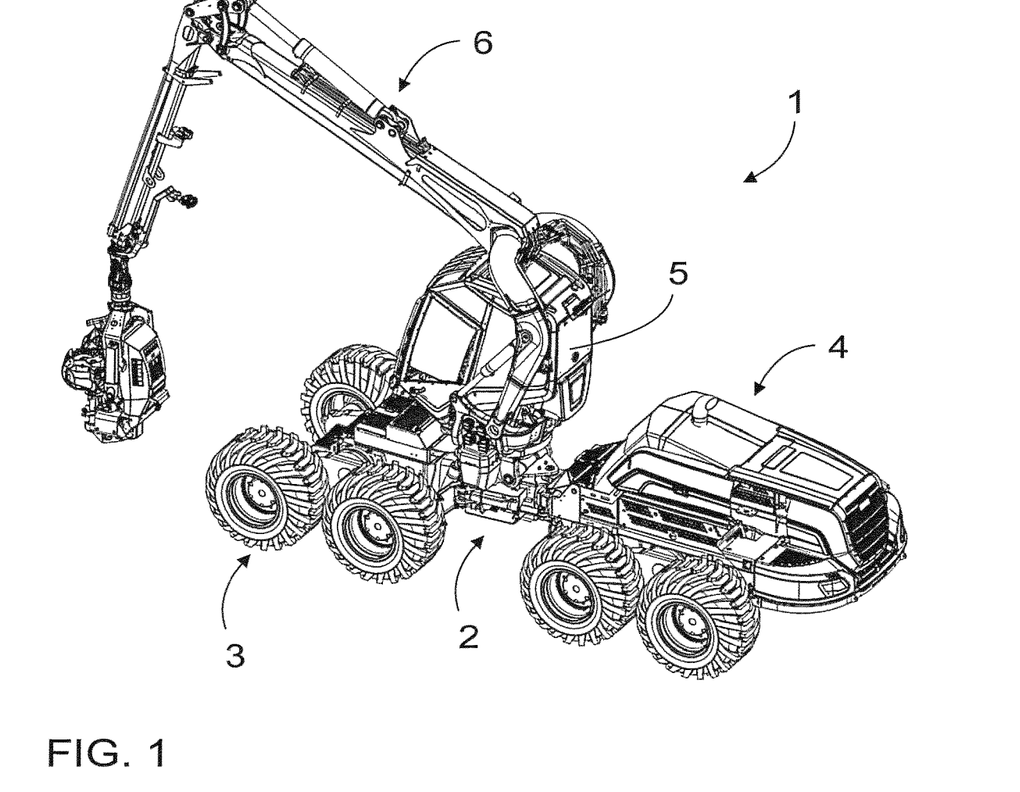
FIG. 1 shows a forestry machine in perspective.

FIG. 1 shows a forestry machine 1, or to be more specific, a harvester. In different embodiment, the forestry machine 1 may comprise, for example, a FIG. 1 type harvester, a forwarder, or their combination, that is, a so-called combination machine, a processor, or another forestry machine known per se.

The forestry machine 1 may comprise a carriage 2 which may consist of one, two or more body parts, moving means 3 which are adapted to the carriage 2 and which may comprise wheels, tracks, tandem axles, track system, or other structural parts known per se and needed for the forestry machine to move, and these may be adapted in connection with one or more body parts in each particular case. The forestry machine 1 may further comprise a primary power source 4, a hydraulic system (unnumbered), a cabin 5 adapted on the carriage, and/or a boom or boom structure 6 adapted to the carriage or cabin. The cabin 5 and/or boom/boom structure 6 may be adapted foldably and/or rotatably in relation to the carriage. In this description, the term boom 6 is also used to refer to boom structures consisting of more than one boom.

Figure 2:
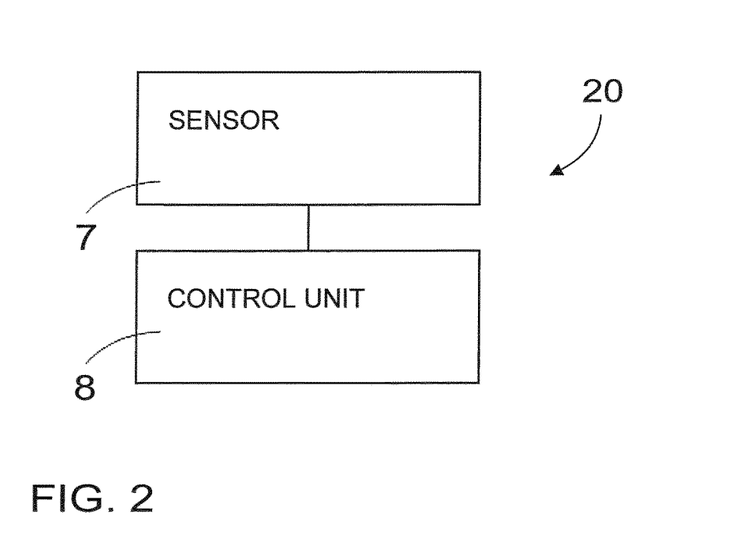
FIG. 2 is a schematic view or a control method in a forestry machine.
Figure 3:
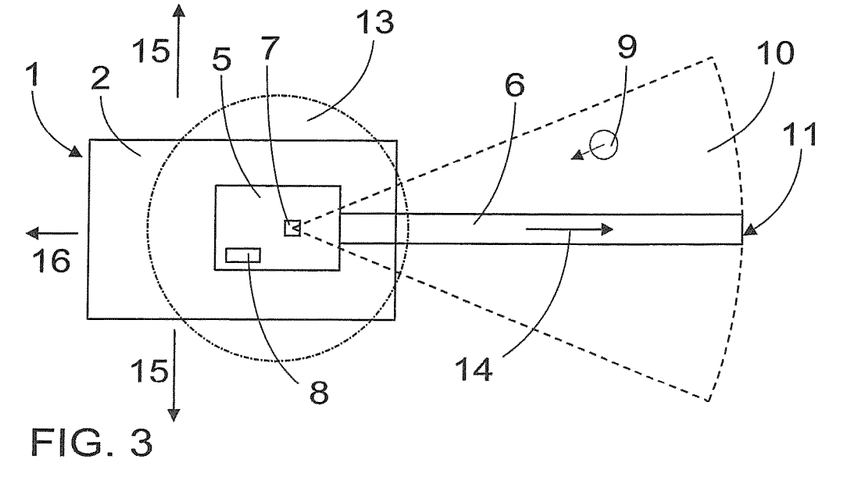
FIG. 3 is a schematic top view of a forestry machine, sector, and safety zone.

FIG. 2 is a schematic view or a control arrangement 20 in a forestry machine 1. FIG. 3 is a schematic top view of a forestry machine, sector, and safety zone. The forestry machine may comprise at least one cabin 5 and at least one boom 6. The control system may comprise at least one sensor 7 and at least one control unit 8.

The sensor 7 may be adapted to detect at least one object 9 in the area of at least one predetermined sector 10. The sector 10 is advantageously focused in the area between the cabin 5 and boom end 11. Boom end 11 refers to the end of a boom or boom structure, which is not adapted to the forestry machine 1. In other words, boom end 11 refers to the end that is opposite in relation to the end of the boom or boom structure fixed to the forestry machine 1. On the boom end 11, a tool 12, such as a harvester head or a grab, may be adapted.

Figure 4A:
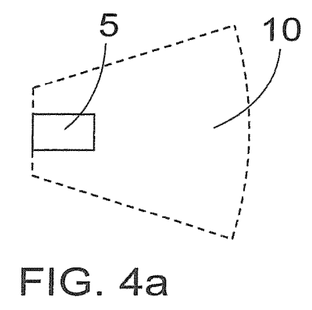
FIGS. 4a, 4b, 4c, 4d and 4e are top views of sectors of different forms.
Figure 4B:
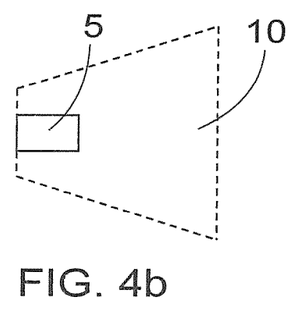
Figure 4C:
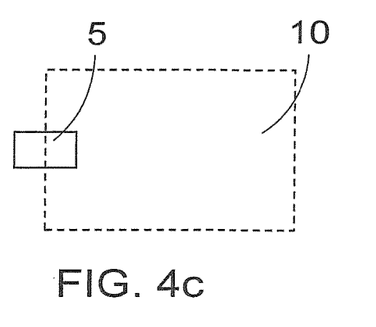
Figure 4D:
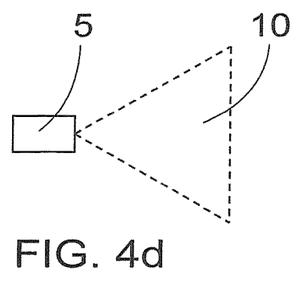
Figure 4E:
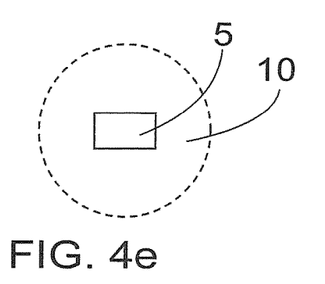

Depending on the embodiment, the form of the sector 10 may be a circle sector as in FIG. 3, a cut circle sector as in FIG. 4a, isosceles trapezoid as in FIG. 4b, rectangle as in FIG. 4c, a triangle as in FIG. 4d, or circle as in FIG. 4e. Likewise, the sector may be, as seen from the side of the forestry machine, for example a circle sector, a cut circle sector, isosceles trapezoid, rectangle, triangle, or circle. The sector 10 may also extend over the cabin 5 and/or boom 6. In the different embodiments, the sector 10 may be defined as fully outside the cabin 5 as in FIG. 4d, or to partially cover the cabin 5 as in FIGS. 3 and 4c, or to fully cover the cabin 5 as in FIGS. 4a, 4b and 4e. Likewise, as seen in the lateral direction, the sector 10 may be defined fully outside the cabin 5 or to partially or fully cover the cabin 5. In other words, the cabin 5 may be entirely or partly adapted inside the sector 10 or entirely outside it. In addition, the sector 10 may be adapted to extend around the cabin 5, for example in such a manner that the sector 10 extends on one, two, three, or four sides of the cabin 5 and/or over the cabin 5, but does not extend to the area of the cabin.

In an embodiment, the sector 10 may comprise the entire detection area of the sensor 7, in other words, the area where the objects 9 are that the sensor can or is adapted to detect. In other words, the sector 10 may comprise the entire maximum detection area of the sensor 7 or the entire area that the sensor 7 is adapted to observe by defining, for example, measurement directions. In a second embodiment, the sector 10 may comprise a determined part of the maximum detection area of the sensor 7 or of the area that the sensor 7 is adapted to observe.

The sensor 7 may furthermore be adapted to detect at least one of the following: the location data of a detected object 9 on at least two different instants of time, and the speed of the detected object 9. In an embodiment, the location data of the object 9 may comprise the distance of the object 9 from the cabin 5, for example from the outer edge of the cabin, or the distance of the object 9 from a specific measurement point. In a second embodiment, the location data of the object 9 may comprise the location of the object 9 in one, two, or three dimensions in relation to a specific measurement point, or in a predetermined coordinate system. The measurement point may be determined in the cabin 5, for example the centre point of the cabin, or a predetermined point on the outer edge of the cabin, the boom 6 such as the end 11 of the boom, a selected joint of the boom or another point on the boom, the sensor 7, or another suitable point on the forestry machine 1. In an embodiment, the sensor 7 may be adapted to detect the speed of the object 9, such as the speed in relation to the cabin 5, boom 6, boom end 11, carriage 2 of the forestry machine or the surroundings of the forestry machine 1, or another measurement point or coordinate system.

The control unit 8 may be adapted to determine at least the direction of travel of said detected object 9 in relation to the cabin 5. The determined direction of travel may comprise, for example, information on whether the object 9 is moving towards or away from the cabin 5. The direction of travel of the object 9 in relation to the cabin may be determined based on the location data of the object detected at two instances of time, at least, and/or the detected speed of the object.

It should be pointed out that the object 9 may be considered to be moving in relation to the cabin 5 when the object 9 is moving and the cabin 5 is stationary, when the cabin 5 is moving and the object 9 is stationary, or when the object 9 and cabin 5 are moving in different directions and/or at different speeds. In other words, the object 9 may be considered moving towards the cabin 5 also in a situation in which the object 9 is stationary and the cabin 5 is moving in relation to it, towards the object 9, for example.

The control unit 8 may be adapted to check the need to cause a change in the control of the forestry machine 1 by checking at least one predetermined control criterion in response to the detected direction of travel of the detected object 9 is towards the cabin 5 within the area of said predetermined sector 10. In addition, the control unit 8 may be adapted to cause a change in the control of the forestry machine 1 in response to the detected direction of travel of the detected object 9 is towards the cabin 5 within the area of the predetermined sector 10 and that said at least one predetermined criterion is fulfilled. In an embodiment, the direction of travel may be considered to be towards the cabin 5 within the sector 10 area, if at least the latest detected location of the object 9 is located at least partly within the sector 10. In an embodiment, the direction of travel may be considered to be towards the cabin 5 within the sector 10 area, if instead or in addition to this the object 9 has been detected within the area of the sector 10 and either the distance of the object 9 in relation to the cabin 5 has become shorter or the direction of movement of the object is such that the distance of the object 9 to the cabin 5 is becoming shorter. In yet another embodiment, the direction of travel may be considered to be towards the cabin 5 within the sector 10 area, if the direction of travel of the object 9 in relation to the cabin is such that if the movement were to continue unchanged, the object 9 would hit the cabin 5.

So, depending on the embodiment, the reference point may comprise a point to which the distance of the object 9 from the cabin is determined, a measurement point, or the zero point of a coordinate system. If the reference point is not immobile in relation to the cabin 5, it is possible to determine, in addition to the location data of the object 9, also the location data of the cabin 5 in relation to the reference point. In such a case, the location data of the object 9 in relation to the cabin 5 may be determined on the basis of the location data of the object 9 and cabin 5, for example, in the control unit 5 and/or the speed of the object 9 in relation to the cabin 5 may be determined from the speed data of the object 9 and cabin 5 in relation to the reference point, for example, in the control unit.

In an embodiment, the control unit 8 may further be adapted to determine the angle of the detected direction of travel in relation to the cabin. In such a case, the control unit 8 may be adapted to determine the direction of travel of the object 9 and the angle of this direction of travel in at least one plane in relation to the cabin 5, for example the centre point of the cabin 5, the closest point of the outer edge of the cabin 5 in relation to the object, or another suitable measurement point.

In an embodiment, the control unit 8 may be adapted to determine the speed of movement of the detected object 9 in relation to the cabin 5. The speed of the object 9 in relation to the cabin 5 may be determined in addition to the direction of travel of the object 9, and in addition to or instead of determining the angle of the direction of travel.

In an embodiment the control unit 8 may be adapted to cause a change in the control of the forestry machine 1 in response to the determined speed of movement of the detected object 9 in relation to the cabin exceeds a speed considered safe. Such a speed that is considered safe may comprise a speed considered safe in a standard or reference literature relating to machine safety, or a speed that has been determined on the basis of the feed rate of the detected object, such as a trunk, average reaction time of a user and/or the distance between the cabin 5 and the detected object, such as the boom end 11, such as the average use position of the cabin 5 and boom end 11, or use position at the reference time. The definition may be carried out, for example, so that if the speed and distance of the detected object in relation to the cabin is such that a user has no time, after detecting the object, to prevent the potential intrusion of the object to the cabin, the control unit 8 is adapted to cause a change in the control of the forestry machine to prevent such an intrusion.

In an embodiment, the control unit 8 may be adapted to cause a change in the control of the forestry machine 1 in response to the determined speed of the detected object 9 in relation to the cabin being at least 3 m/s. In a second embodiment, the control unit 8 may be adapted to cause a change in the control of the forestry machine 1 in response to the determined speed of the detected object 9 in relation to the cabin being at least 4 m/s. In a third embodiment, the control unit 8 may be adapted to cause a change in the control of the forestry machine 1 in response to the determined speed of the detected object 9 in relation to the cabin being at least 5 m/s. In these embodiments, the determined speed of the object 9 in relation to the cabin 5 may in such a case form a control criterion, or at least one of the control criteria, and this control criterion may be considered fulfilled when the speed at least equals the predetermined one, such as at least 3 m/s, 4 m/s or 5 m/s.

In an embodiment, at least one sensor 7 may be adapted to detect at least one dimension of the detected object 9. In an embodiment, at least one dimension of the detected object 9 may be determined, in addition to or instead of the sensor 7, in the control unit 8, based on the information composed by the sensor 7, for example. The dimension of the object 9 may comprise the height, length and/or width of the object 9 as seen from the direction of the cabin 5, as seen from the reference point and/or in a predetermined coordinate system, such as the coordinate system used in determining the location data. In an embodiment, the control unit 8 may be adapted to cause a change in the control of the forestry machine 1 in response to the dimension of the detected object 9 being at least 5 cm. In some other embodiments, the control unit 8 may be adapted to cause a change in the control of the forestry machine 1 in response to the dimension of the detected object 9 being at least 1.5 cm or 3 cm. In these embodiments, at least one dimension of the object 9 may in this case form the control criterion, or at least one of the control criteria, and this control criterion may be considered fulfilled when the dimension at least equals the predetermined one, such as at least 1.5 cm, at least 3 cm, or at least 5 cm.

In an embodiment, the control unit 8 may be adapted to cause a change in the control of the forestry machine 1 by forming at least one control command which is adapted to affect the control of the forestry machine 1.

In an embodiment, the change to the control of the forestry machine 1 may comprise slowing down or stopping feed rollers, at least one actuator of the driving transmission, at least one actuator of the boom, or another function of the forestry machine or operation of an actuator. In an embodiment, the change in the control of the forestry machine may be gradual whereby the operation is first slowed down a little and gradually or steplessly more until the operation is finally stopped. In such embodiments, at least one control criteria may similarly have one, two, or more stages or threshold values. In such a case, any of the aforementioned operations may be, for example, slowed down when a first threshold value of a control criterion is exceeded, and the operation may be stopped when a second threshold value of the control criterion is exceeded, or the operation may be slowed down when a first threshold value of a control criterion is exceeded, and the operation may be slowed down more when a second threshold value is exceeded. In this case, the determined speed of the object 9 in relation to the cabin 5 may have, for example, one, two, or more threshold values, such as a first threshold value of 3 m/s and a second threshold value of 4 m/s or 5 m/s. Correspondingly, the dimension of the object 9 may have two or three threshold values, such as 1.5 cm, 3 cm and/or 5 cm, or other appropriate threshold values which may constitute the first threshold value and/or second threshold value.

In an embodiment, at least one sensor 7, 7' is adapted to detect at least one object 9, 9' which is not a structural part of the forestry machine 1, within the area of a predetermined safety zone 13. The sensor by means of which the object 9 within the area of the safety zone 13 is detected, may be the same sensor 7 by means of which an object or objects are detected in the sector 10 area, or a separated sensor 7'. Correspondingly, an object that is detected within the area of the safety zone may be the same object 9 that is detected in the sector 10 area or a different object 9'. In an embodiment, the safety zone may at least partly differ from the predetermined sector 10 area. In other words, in an embodiment the safety zone 13 and sector 10 may at least partly overlap and/or the safety zone 13 may comprise at least part of the area of the sector 10. In an embodiment, the safety zone 13 may be located entirely inside the sector 10, comprising a part of the sector 10. In an embodiment, the safety zone 13 may comprise the entire sector 10, that is, the safety zone 13 and sector 10 may be equal.

In an embodiment, the predetermined safety zone 13 comprises an area extending to a distance of 1.5 metres from the cabin 5 of the forestry machine. The safety zone 13 may in this case extend to a distance of 1.5 metres from the cabin 5 of the forestry machine when measured in the horizontal plane, or when the distance of the object 9, 9' is measured to a point of the cabin 5 closest the object 9, 9' or to a predetermined measurement point.

In an embodiment, at least one control unit 8 may be adapted to cause a change in the control of the forestry machine 1 in response to the sensor 7, 7' having detected an object 9, 9' not belonging to the forestry machine 1 in the safety zone. In an embodiment, the control unit 8 may be adapted to cause the operation of the forestry machine 1 to stop in response to the detection of an object 9, 9' that is not a structural part of the forestry machine 1, in the area of the safety zone 13. In this context, stopping the operation of the forestry machine does not refer to stopping the operation of the forestry machine 1 or its control system, such as the control unit. Instead, stopping the operation may, depending on the embodiment and type of detected object 9, 9', refer to stopping the feed rollers, directing the driving transmission operation to stop the driving movement of the forestry machine 1, or controlling the boom 6 to stop an object 9, 9', such as a trunk 17, adapted to the boom.

In an embodiment, at least one sensor 7, 7' may comprise at least one of the following: LiDAR, camera, machine vision, ultrasound measuring device, and radar. The camera may comprise a so-called ToF camera (Time of Flight) by means of which a two-dimensional image or distance data related to its dots may be formed. The sensor 7, 7' may also comprise a combination of a camera forming a conventional two-dimensional image and a device suitable for distance measurements. In yet another embodiment, in which the sensor 7, 7' comprises a camera, the definition of an object's 9, 9' location or speed may be based on, for example, the change in the object 9, 9' size in the camera image and/or ratio to another identified piece in a pattern.

In an embodiment, at least one said sensor 7, 7' is adapted to at least one of the following; in connection with a cabin window, above the cabin outside the cabin, top part of the cabin inside the cabin, body of the forestry machine, boom of the forestry machine, front body of the forestry machine, rear body of the forestry machine, and a structure external to the forestry machine moving with the forestry machine.

In an embodiment, the predetermined sector 10 is directed from the cabin of the forestry machine towards at least the main working direction 14 of the boom 6, as in FIGS. 3 and 4*a*-4*e*. The main working direction of the boom 6 refers to the direction to which the working of the boom or boom structure in the neutral position of the cabin 5 is for the most part directed. The neutral position of the cabin 5 refers to the normal, non-rotational direction of the cabin 5 during transport, for example. The main working direction of the boom 6 is directed in the neutral position of the cabin forward as seen from the cabin 5 or an operator's seat (not shown) adapted in the cabin, that is, forward from an operator sitting in the seat.

In an embodiment, the main working direction of the boom 6 may be from the cabin 5 towards the end 11 of the boom. Such an embodiment may be an embodiment where the sector 10 is defined in relation to the direction of the cabin 5. such as a rotating cabin, and/or boom 6, whereby the sector 10 rotates together with the cabin 5 and/or boom 6.

In an embodiment, the predetermined sector 10 is additionally directed from the cabin 5 of the forestry machine to at least two transverse sides 15, in relation to the boom main working direction, as in FIGS. 4a, 4b, 4c and 4e, for example. In an embodiment, the predetermined sector 10 is additionally directed from the forestry machine cabin to the opposite direction 16 in relation to the boom main working direction 14, as in FIG. 4e, for example.

In an embodiment, said predetermined sector extends to a distance of at least 15 metres from the cabin 5 of the forestry machine 5 in at least one direction 14, 15, 16.

In an embodiment, the predetermined sector 10 extends to substantially the distance matching the reach of the boom 6 from the cabin 5 of the forestry machine.

Figure 5:
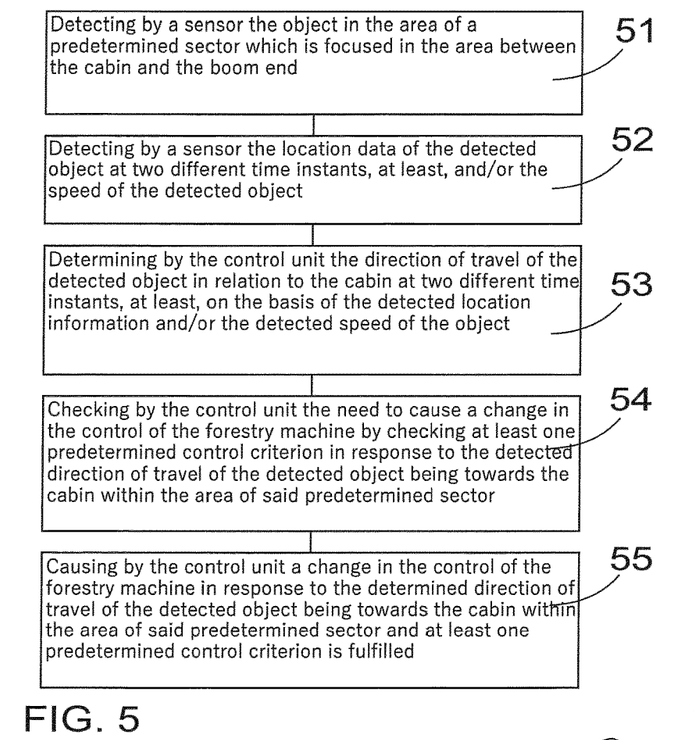
FIG. 5 shows a method for controlling a forestry machine.

FIG. 5 shows a method for controlling a forestry machine. The forestry machine 1 may comprise at least one cabin 5 and at least one boom 6. In the method, with at least one sensor 7 at least one object 9 is detected 51 within the area of at least one predetermined sector 10. The sector 10 may be focused in the area between the cabin and the boom end 11.

Furthermore, in the method, with the sensor 7 at least one of the following is detected 52: the location data of said detected object 9 at two instants of time, at least, and the speed of said detected object 9.

Furthermore in the method, with at least one control unit 8 at least the direction of travel of said detected object 9 is determined 53 in relation to the cabin 5 on the basis of the location data of said object 9 at two detected instants of time, at least, and/or the detected speed of the object 9.

Furthermore in the method, the need is checked 54 to cause a change in the control of the forestry machine 1 by checking at least one predetermined control criterion in response to the detected direction of travel of the detected object 9 being towards the cabin 5 within the area of said predetermined sector 10.

Additionally in the method, a change is caused 55 in the control of the forestry machine 1 by the control unit in response to the determined direction of travel of the detected object 9 is towards the cabin 5 within the area of said predetermined sector 10 and said at least one predetermined control criterion is fulfilled. In other words, the change in the control of the forestry machine 1 may in such a case be carried out only when the determined direction of travel of the detected object 9 is towards the cabin 5 within the area of said predetermined sector 10 and in addition said at least one predetermined control criterion is fulfilled. In an embodiment, a change in the control of the forestry machine 1 may be carried out only when the determined direction of travel of the detected object 9 is towards the cabin 5 within the area of said predetermined sector 10 at substantially the same time as said at least one predetermined control criterion is fulfilled.

In an embodiment, in the method it is further detected by means of at least one sensor 7, 7' at least one object 9, 9' which object 9, 9' is not a structural part of the forestry machine 1, in the area of the predetermined safety zone 13. In this case, at least one control unit 8 may be employed to cause a change in the control of the forestry machine 1 in response to the sensor 7, 7' having detected said object 9, 9' not belonging to the forestry machine 1, in the safety zone 13. In an embodiment, the safety zone 13 may at least partly differ from the predetermined sector 10 area.

Figure 6:
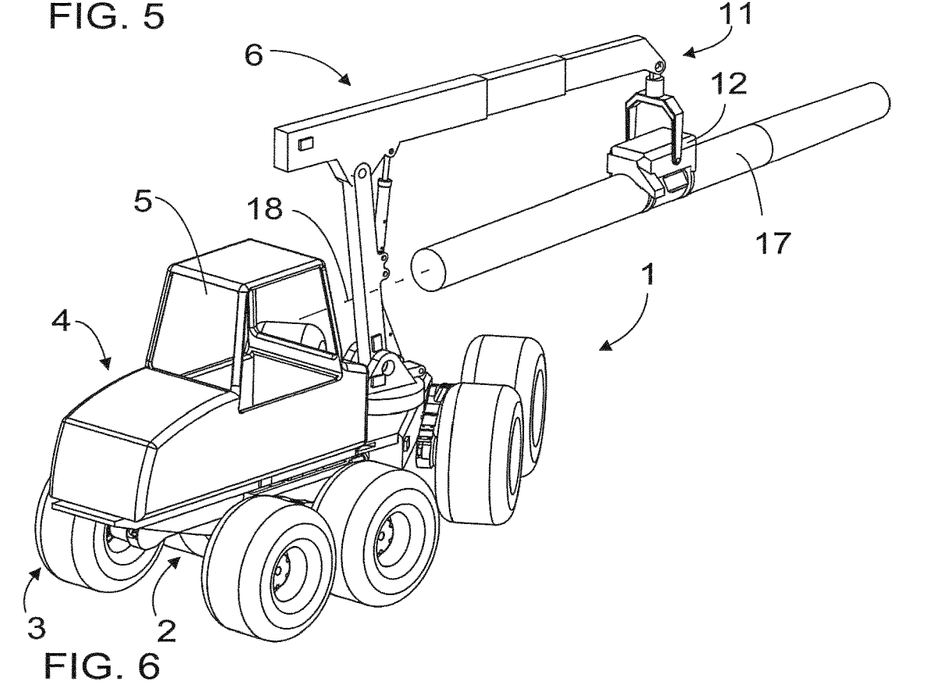
FIG. 6 is a schematic view of a forestry machine in perspective.

FIG. 6 is a schematic view of a forestry machine 1 in perspective. The forestry machine may correspond as to its essential parts one of the forestry machines 1 described in this description. The forestry machine of FIG. 6 is a harvester by in the various embodiments the forestry machine 1 may comprise a load machine/forwarder, a combination machine, processor, or another forestry machine known per se. In FIG. 6, a tool 12 is adapted to the boom 6 of the forestry machine 1. The tool 12 may in some embodiments be a tool suitable for grabbing a trunk 17, for example, and/or for its handling, such as a harvester head or a grab. The trunk 17 may in this case form the object 9, 9', if it during the grabbing to the trunk and/or handling it ends up in the area of the predetermined sector 10 and/or safety zone 13. FIG. 6 shows an example of a situation where the longitudinal axis 18 of the trunk is directed towards the cabin. 5. If the trunk 17 moves in this case in the direction of its longitudinal axis 18, for example, or in another direction so that the distance between the trunk 17 and the cabin 5 is reduced, the trunk 17 may form the detected object 9 and its direction of travel may be considered to be directed towards the cabin 5. The trunk 17, which as mentioned in the above, may also from the detected object, may move towards the cabin 5 either so that the cabin 5 moves and the trunk 17 stays put, so that the trunk 17 is moved with the boom 6 towards the cabin 5, or so that the trunk 17 is fed by a tool 12, such as a harvester head, towards the cabin 5.

Figure 7:
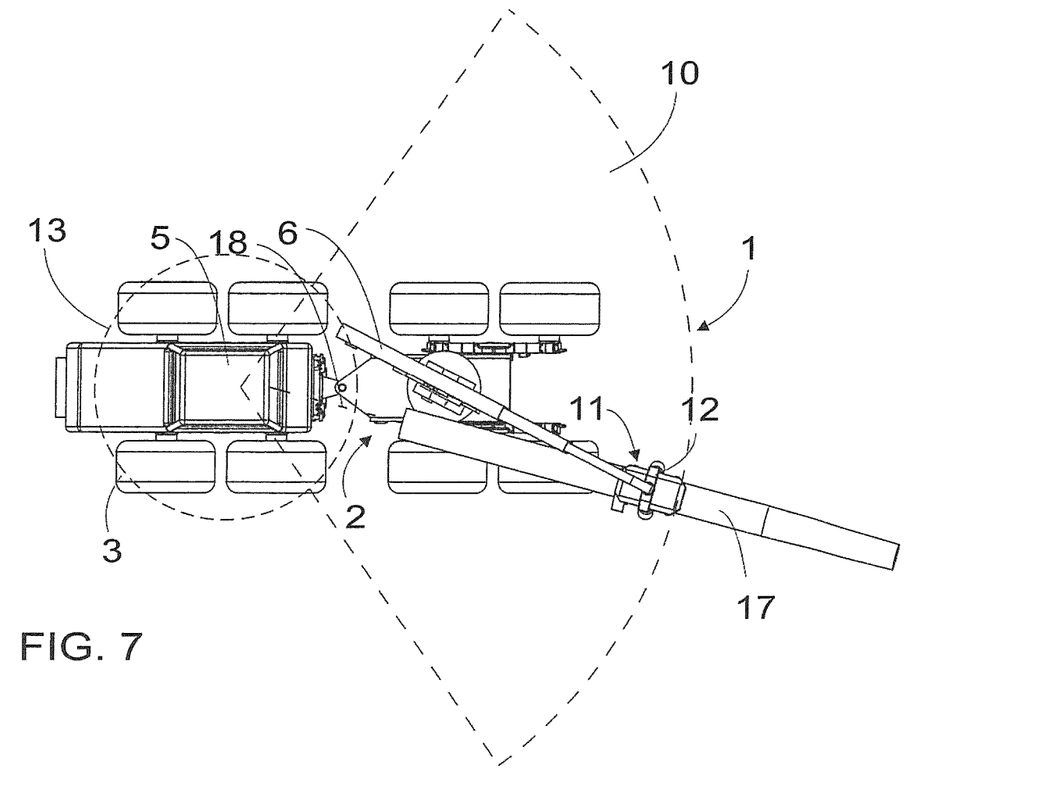
FIG. 7 shows a similar forestry machine 1 and situation as FIG. 6, but as seen from above.

FIG. 7 shows a similar forestry machine 1 and situation as FIG. 6, but as seen from above. FIG. 7 also illustrates a sector 10 and safety zone 7 according to an embodiment.

An embodiment comprises a computer program product, which comprises a program code which when run in a processor, such as the control unit 8, causes the control arrangement described in this description and/or figures to carry out a method, or at least some of the phases of such a method, described in this description and/or figures.

In an embodiment, the forestry machine 1 comprises any of the control arrangements disclosed in this description and/or figures.

A person skilled in the art will find it obvious that, as technology advances, the basic idea of the invention may be implemented in many different ways. The invention and its embodiments are thus not restricted to the above-described examples but may vary within the scope of the claims.

The invention claimed is:

1. A control arrangement in a forestry machine, the forestry machine comprising at least one cabin and at least one boom, the arrangement comprising:
    one or more sensors configured to detect at least one object in an area of at least one sector, the at least one sector being focused in an area between the cabin and boom end, the one or more sensors being further configured to detect at least one of: location data of said detected object for at least two different times, and a speed of said detected object, wherein the detected object is a tree trunk held by a tool of the forestry machine at the boom end, and
    at least one controller configured to determine at least a direction of travel of said detected object in relation to the cabin at two different times, at least, based on the detected location data and/or the detected speed of the object, check a need to cause a change in the control of the forestry machine by checking at least one control criterion in response to the determined direction of travel of the detected object being directed towards the cabin in the area of said at least one sector, and cause a change in the control of the forestry machine in response to the determined direction of travel of the detected object being directed towards the cabin in the area of the at least one sector and in fulfilling the at least one control criterion.

2. The control arrangement as claimed in claim 1, wherein the controller is further configured to determine an angle of the direction of travel of the detected object in relation to the cabin.

3. The control arrangement as claimed in claim 1, wherein the controller is further configured to determine a speed of the travel of the detected object in relation to the cabin.

4. The control arrangement as claimed in claim 3, wherein the speed of the travel of the detected object in relation to the cabin forms at least one of said control criteria, and
wherein the controller is further configured to cause a change in the control of the forestry machine in response to the determined speed of the detected object in relation to the cabin being at least 3 m/s.

5. The control arrangement as claimed in claim 1, wherein at least one of the one or more sensors is configured to detect at least one dimension of the detected object.

6. The control arrangement as claimed in claim 1, wherein the controller is further configured to cause a change in the control of the forestry machine by forming at least one control command that is configured to affect the control of the forestry machine.

7. The control arrangement as claimed in claim 1, wherein:
at least one of the one or more sensors is configured to detect at least one object which is not a structural part of the forestry machine, within a safety zone, and
the controller is further configured to cause a change in the control of the forestry machine in response to a detection of said object not belonging to the forestry machine, in the safety zone.

8. The control arrangement as claimed in claim 7, wherein said safety zone differs at least in part from the area of the at least one sector.

9. The control arrangement as claimed in claim 7, wherein said safety zone comprises an area that extends to a distance of 1.5 meters from the cabin of the forestry machine.

10. The control arrangement as claimed in claim 7, wherein the controller is further configured to cause operation of the forestry machine to stop in response to the detection of an object that is not a structural part of the forestry machine, in the safety zone.

11. The control arrangement as claimed in claim 1, wherein the one or more sensors use at least one of: LiDAR, a camera, machine vision, an ultrasound measuring device, and radar.

12. The control arrangement as claimed in claim 1, wherein the one or more sensors is located in or on one or more of: a cabin window, above and outside of the cabin, a top part of the cabin inside the cabin, a body of the forestry machine, the boom of the forestry machine, a front body of the forestry machine, a rear body of the forestry machine, and a structure external to the forestry machine that moves with the forestry machine.

13. The control arrangement as claimed in claim 1, wherein said at least one sector is directed from the cabin of the forestry machine at least towards a main working direction of the boom.

14. The control arrangement as claimed in claim 13, wherein said at least one sector is additionally directed from the cabin of the forestry machine to at least two transverse sides, in relation to the main working direction of the boom.

15. The control arrangement as claimed in claim 14, wherein said at least one sector is additionally directed from the forestry machine cabin to a direction opposite the main working direction of the boom.

16. The control arrangement as claimed in claim 1, wherein said at least one sector extends to a distance of at least 15 meters from the cabin of the forestry machine.

17. The control arrangement as claimed in claim 1, wherein said at least one sector extends to substantially a distance matching a reach of the boom from the cabin of the forestry machine.

18. A method for controlling a forestry machine including at least one cabin and at least one boom, the method comprising:
detecting by one or more sensors at least one object in an area of at least one sector, the at least one sector being focused in an area between the cabin and boom end, wherein the detected object is a tree trunk held by a tool of the forestry machine at the boom end,
detecting by the one or more sensors at least one of: location data of said detected object for at least two different times, and a speed of said detected object,
determining by a controller at least a direction of travel of said detected object in relation to the cabin at two different times, at least, based on the detected location data and/or the detected speed of the object,
checking by the controller a need to cause a change in the control of the forestry machine by checking at least one control criterion in response to the detected direction of travel of the detected object being towards the cabin within the area of said at least one sector, and
causing by the controller a change in the control of the forestry machine in response to the determined direction of travel of the detected object being towards the cabin within the area of said at least one sector and said at least one control criterion being fulfilled.

19. The method as claimed in claim 18, further comprising:
detecting by at least one of the one or more sensors at least one object which is not a structural part of the forestry machine, within a safety zone, the safety zone at least partly differing from the area of the at least one sector, and
causing by the controller a change in the control of the forestry machine in response to a detection of said object not belonging to the forestry machine in the safety zone.

20. The method as claimed in claim 19, wherein said safety zone differs at least in part from the area of the at least one sector.

21. A non-transitory computer program product comprising program code that, when processed by a processor, controls a forestry machine including at least one cabin and at least one boom, by performing operations comprising:
detecting by one or more sensors at least one object in an area of at least one sector, the at least one sector being focused in an area between the cabin and boom end, wherein the detected object is a tree trunk held by a tool of the forestry machine at the boom end,
detecting by the one or more sensors at least one of: location data of said detected object for at least two different times, and a speed of said detected object,
determining by a controller at least a direction of travel of said detected object in relation to the cabin at two different times, at least, based on the detected location data and/or the detected speed of the object,
checking by the controller a need to cause a change in the control of the forestry machine by checking at least one control criterion in response to the detected direction of travel of the detected object being towards the cabin within the area of said at least one sector, and causing by the controller a change in the control of the forestry machine in response to the determined direction of travel of the detected object being towards the cabin within the area of said at least one sector and said at least one control criterion being fulfilled.

22. A forestry machine comprising the control arrangement of claim 1.

* * * * *